United States Patent
John

(10) Patent No.: US 11,349,944 B2
(45) Date of Patent: *May 31, 2022

(54) DIRECTORY ASSISTED ROUTING OF CONTENT IN AN INFORMATION CENTRIC NETWORK

(71) Applicant: Gramboo Inc., Sunnyvale, CA (US)

(72) Inventor: Nitish John, Sunnyvale, CA (US)

(73) Assignee: Gramboo Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/119,685

(22) Filed: Dec. 11, 2020

(65) Prior Publication Data

US 2021/0099536 A1 Apr. 1, 2021

Related U.S. Application Data

(63) Continuation of application No. 16/432,713, filed on Jun. 5, 2019, now Pat. No. 10,887,412.

(Continued)

(51) Int. Cl.
*H04L 67/55* (2022.01)
*H04L 67/63* (2022.01)
*H04L 67/568* (2022.01)
*H04L 45/748* (2022.01)
*H04L 45/302* (2022.01)

(52) U.S. Cl.
CPC ........... *H04L 67/26* (2013.01); *H04L 45/306* (2013.01); *H04L 45/748* (2013.01); *H04L 67/2842* (2013.01); *H04L 67/327* (2013.01)

(58) Field of Classification Search
CPC ..... H04L 67/26; H04L 45/306; H04L 45/748; H04L 67/2842; H04L 67/327; H04L 67/2814

See application file for complete search history.

(56) References Cited

U.S. PATENT DOCUMENTS 8,762,570 B2 6/2014 Qian et al.
9,253,091 B2 2/2016 Orange
(Continued)

FOREIGN PATENT DOCUMENTS

AU 2013252250 B2 10/2013
EP 3 151 517 A1 4/2017

OTHER PUBLICATIONS

Xylomenos, G. et al., "A Survey of Information-Centric Networking Research", IEEE Communications Surveys & Tutorials; vol. 16, Issue 2, Jul. 19, 2013 (26 pages).
(Continued)

*Primary Examiner* — Philip C Lee
(74) *Attorney, Agent, or Firm* — Ferguson Braswell Fraser Kubasta PC

(57) ABSTRACT

A method is disclosed. The method includes: obtaining, by an authoritative directory router in an information centric network (ICN), a publish message associated with a publisher node and including: an identifier associated with a content item; and a first anchor prefix for a first anchor directory router for the publisher node; determining that a bidirectional code for the identifier falls within an authoritative code range assigned to the authoritative directory router; and updating, in response to the bidirectional code falling within the authoritative code range, a local code repository associated with the authoritative directory router with the first anchor prefix and the identifier.

13 Claims, 12 Drawing Sheets

Related U.S. Application Data

(60) Provisional application No. 62/680,962, filed on Jun. 5, 2018.

(56) References Cited

U.S. PATENT DOCUMENTS

| | | |
|---|---|---|
| 9,769,034 B2 | 9/2017 | Ravindran et al. |
| 2014/0321480 A1 | 10/2014 | Xue et al. |
| 2015/0365495 A1 | 12/2015 | Fan et al. |
| 2016/0050068 A1 | 2/2016 | Mahadevan |
| 2016/0182353 A1 | 6/2016 | Garcia-Luna-Aceves |
| 2016/0352614 A1 | 12/2016 | Valencia Lopez et al. |
| 2017/0093710 A1 | 3/2017 | Garcia-Luna-Aceves |
| 2017/0257342 A1 | 9/2017 | Mosko |
| 2017/0324662 A1 | 11/2017 | Holmberg |

OTHER PUBLICATIONS

Van Leeuwen, J. et al., "Interval Routing", The Computer Journal, vol. 30, No. 4, pp. 298-307, Jan. 1, 1987 (10 pages).

Santoro, N. et al., "Labelling and Implicit Routing in Networks", The Computer Journal, vol. 28, No. 1, Jan. 1, 1985, pp. 5-8 (4 pages).

Bakker, E. M. et al. "Prefix Routing Schemes in Dynamic Networks", Computer Networks and ISDN Systems, vol. 26, Issue 4, pp. 403-421, Dec. 1993 (19 pages).

Santoro, Nicola, "Sense of Direction, Topological Awareness and Communication Complexity", ACM SIGACT News, vol. 16, Issue 2, Jul. 1, 1984, pp. 50-56 (7 pages).

International Search Report in related International Application No. PCT/US2019/035646 dated Sep. 26, 2019, (3 pages).

Written Opinion of the International Searching Authority in related International Application No. PCT/US2019/035646 dated Sep. 26, 2019 (5 pages).

Mokbel, M. F. et al. "Analysis of Multi-Dimensional Space-Filling Curves", GeoInformatica vol. 7, Issue 3, Sep. 2003, pp. 179-209 (31 pages).

Directory Router
510

Link Cost Repository
511

Interval Repository
515

Local Routing Repository
515

Local Code Repository
517

Content Items Cache
519

FIG. 5A

| Destination Prefix | ID | Next Router | Interface | Number of Hops |
|---|---|---|---|---|
| 010 | Q | F | I1 | 3 |
| 110 | N | J | I2 | 3 |
| 0 | C | C | I3 | 1 |
| 0 | C | F | I1 | 3 |
| | Publisher Node 1 | J | I2 | 3 |
| | Subscriber Node 1 | C | I3 | 2 |

Link Cost Repository 511

FIG. 5B

DIRECTORY ASSISTED ROUTING OF CONTENT IN AN INFORMATION CENTRIC NETWORK

CROSS-REFERENCE TO RELATED APPLICATIONS

This application is a continuation of, and therefore claims benefit under 35 U.S.C. § 120 to, U.S. patent application Ser. No. 16/432,713 filed on Jun. 5, 2019. U.S. patent application Ser. No. 16/432,713 claims priority to U.S. Provisional Patent Application Ser. No. 62/680,962, which filed on Jun. 5, 2018, under 35 U.S.C. § 119(e). U.S. Provisional Patent Application Ser. No. 62/680,962 and U.S. patent application Ser. No. 16/432,713 are hereby incorporated by reference in their entirety.

BACKGROUND

The modern day Internet architecture is designed around a host-centric communication model. However, as the number of devices connected to networks continues to increase, and as the data traffic continues to increase, a new architecture for the Internet will be needed that puts content at the core of its design in order to alleviate the problems seen with scaling content distribution, mobility, security, caching and trust in host-centric networks.

SUMMARY

In general, in one aspect, the one or more embodiments of the invention are directed towards a method. The method comprises: obtaining, by an authoritative directory router in an information centric network (ICN), a publish message associated with a publisher node and comprising: an identifier associated with a content item; and a first anchor prefix for a first anchor directory router for the publisher node; determining that a bidirectional code for the identifier falls within an authoritative code range assigned to the authoritative directory router; and updating, in response to the bidirectional code falling within the authoritative code range, a local code repository associated with the authoritative directory router with the first anchor prefix and the identifier.

In general, in one aspect, the one or more embodiments of the invention are directed towards an information centric network (ICN). The ICN comprises a first anchor directory router comprising a first anchor prefix, a second anchor directory router comprising a second anchor prefix, and an authoritative directory router. The first anchor directory router is configured to: obtain a publish message comprising an identifier associated with a content item; determine a bidirectional code for the content item is outside an authoritative code range assigned to the first anchor directory router; insert the first anchor prefix into the publish message; and forward the publish message based on interval routing and the bidirectional code. The second anchor directory router is configured to: obtain a lookup message comprising the identifier; determine the bidirectional code for content item is outside an authoritative code range assigned to the second anchor directory router; insert the second anchor prefix into the lookup message; and forward the lookup message based on interval routing and the bidirectional code. The authoritative directory router configured to: obtain the publish message and the lookup message; determine the bidirectional code for the identifier falls within an authoritative code range assigned to the authoritative directory router; generate, in response to the lookup message, a lookup reply message comprising the identifier, the first anchor prefix in the publish message, and the second anchor prefix in the lookup message; and forward the lookup reply message based on the second anchor prefix in the lookup reply message and prefix routing.

In general, in one aspect, the one or more embodiments of the invention are directed towards a method. The method comprises: obtaining, by a first anchor directory router (ADR) in an information centric network (ICN), a publish message comprising a first identifier associated with a first content item; determining, by the first ADR, a first bidirectional code for the first identifier is outside an authoritative code range assigned to the first ADR; inserting, by the first ADR and in response to determining the first bidirectional code is outside the authoritative code range assigned to the first ADR, a first anchor prefix of the first ADR into the publish message; forwarding the publish message comprising the first anchor prefix based on the first bidirectional code and interval routing; and obtaining a publish acknowledge message comprising the first anchor prefix and generated by a first authoritative directory router in the ICN, wherein the first bidirectional code falls within an authoritative code range assigned to the first authoritative directory router, and wherein the publish acknowledgement message transits through the ICN based on the first anchor prefix in the publish acknowledge message and prefix routing.

Other aspects of the embodiments will be apparent from the following description and the appended claims.

BRIEF DESCRIPTION OF DRAWINGS

FIGS. 5A, 5B, and FIG. 5C show routers and repositories within an ICN in accordance with one or more embodiments of the invention.

DETAILED DESCRIPTION

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may succeed (or precede) the second element in an ordering of elements.

One or more embodiments of the invention are directed towards an information centric network (ICN) including multiple directory routers. Each content item (e.g., image file, video file, audio file, executable file, pdf document, spreadsheet, webpage, etc.) that is accessible via the ICN is associated with a bidirectional code (e.g., a space filling curve code). Moreover, each directory router may be labelled with a prefix and each directory router may be assigned one or more intervals of bidirectional codes (i.e., one or more authoritative code ranges). Messages transit within the ICN based on prefix routing and/or interval routing. The use of prefix routing and/or interval routing avoids large routing tables that plague host-centric networks. The use of prefix routing and/or interval routing also avoids the need for pending interest tables (PITs) and flooding operations often found in existing ICNs. These are technical improvements to at least the technical fields of computer networks and data management.

Figure 1A:
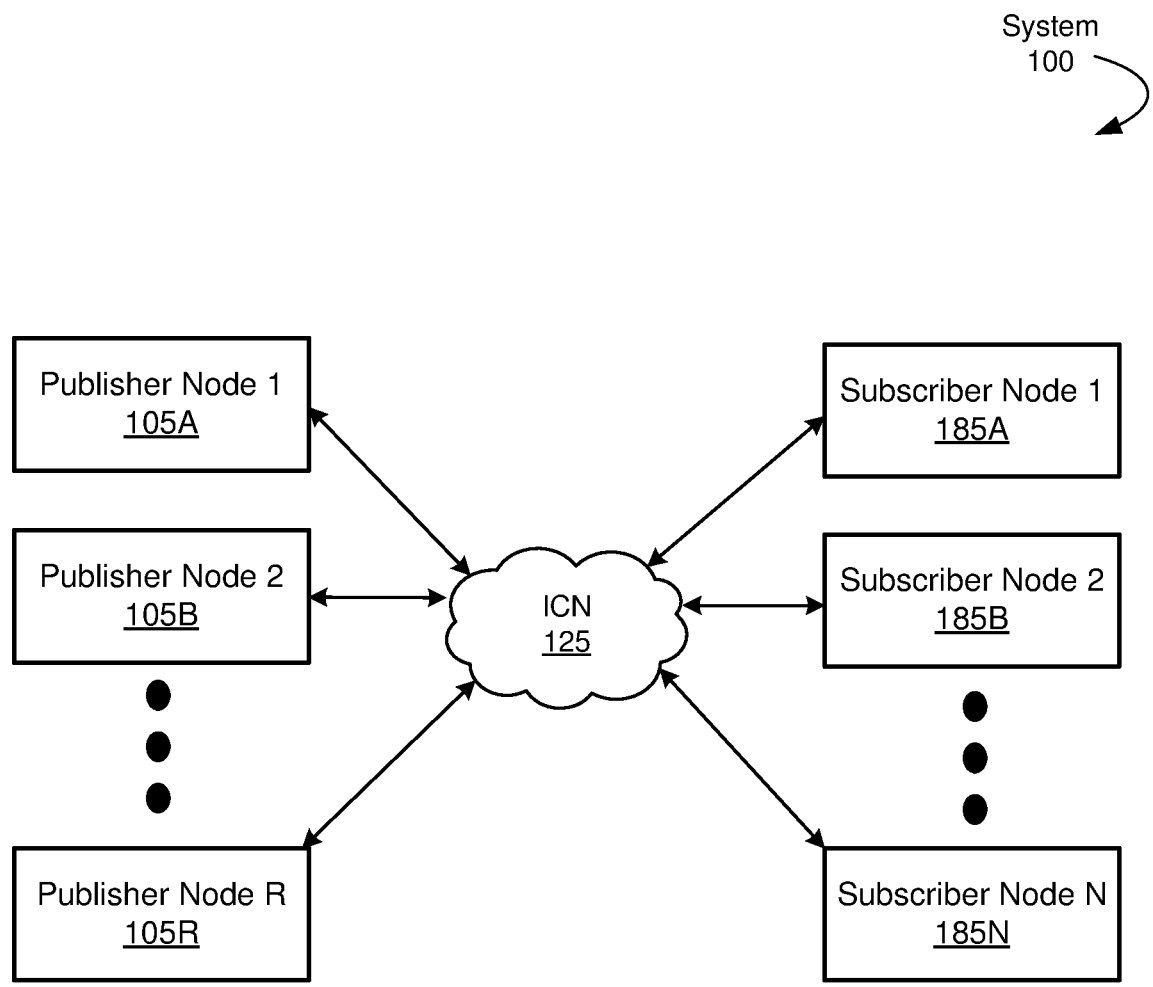
FIGS. 1A, 1B, and 1C show one or more information centric networks (ICNs) in accordance with one or more embodiments of the invention.

FIG. 1A shows a system (100) in accordance with one or more embodiments of the invention. As shown in FIG. 1A, the system (100) has multiple components including one or more publisher nodes (i.e., publisher node 1 (105A), publisher node 2 (105B), publisher node R (105R)) and one or more subscriber nodes (i.e., subscriber node 1 (185A), subscriber node 2 (185B), and subscriber node N (185N)). Each publisher node (105A, 105B, 105R) and each subscriber node (185A, 185B, 185N) may correspond to a computing device (e.g., personal computer (PC), tablet PC, server, smart phone, mainframe, kiosk, etc.). Moreover, each of the publisher nodes (105A, 105B, 105R) and each of the subscriber nodes (185A, 185B, 185N) may also be referred to as a host. Further, each publisher node (105A, 105B, 105R) and each subscriber node (185A, 185B, 185N) may have a unique identity (e.g., unique name, unique serial number, etc.).

In one or more embodiments, each publisher node (105A, 105B, 105R) publishes (e.g., makes available) one or more content items (e.g., image file, video file, audio file, executable file, pdf document, spreadsheet, webpage, etc.). The number and type of content items published by a publisher node may change over time. In one or more embodiments, each subscriber node (108A, 185B, 185R) seeks access to one or more of the content items. In other words, the publisher nodes (105A, 105B, 105R) are effectively sources of content items while the subscriber nodes (185A, 185B, 185N) are effectively consumers of the content items.

Still referring to FIG. 1A, the publisher nodes (105A, 105B, 105R) and the subscriber nodes (185A, 185B, 185N) are connected by the ICN (125). The ICN (125) may be of any size including wired and/or wireless segments. The number of publisher nodes and subscriber nodes connected to the ICN (125) may change over time.

Figure 1B:
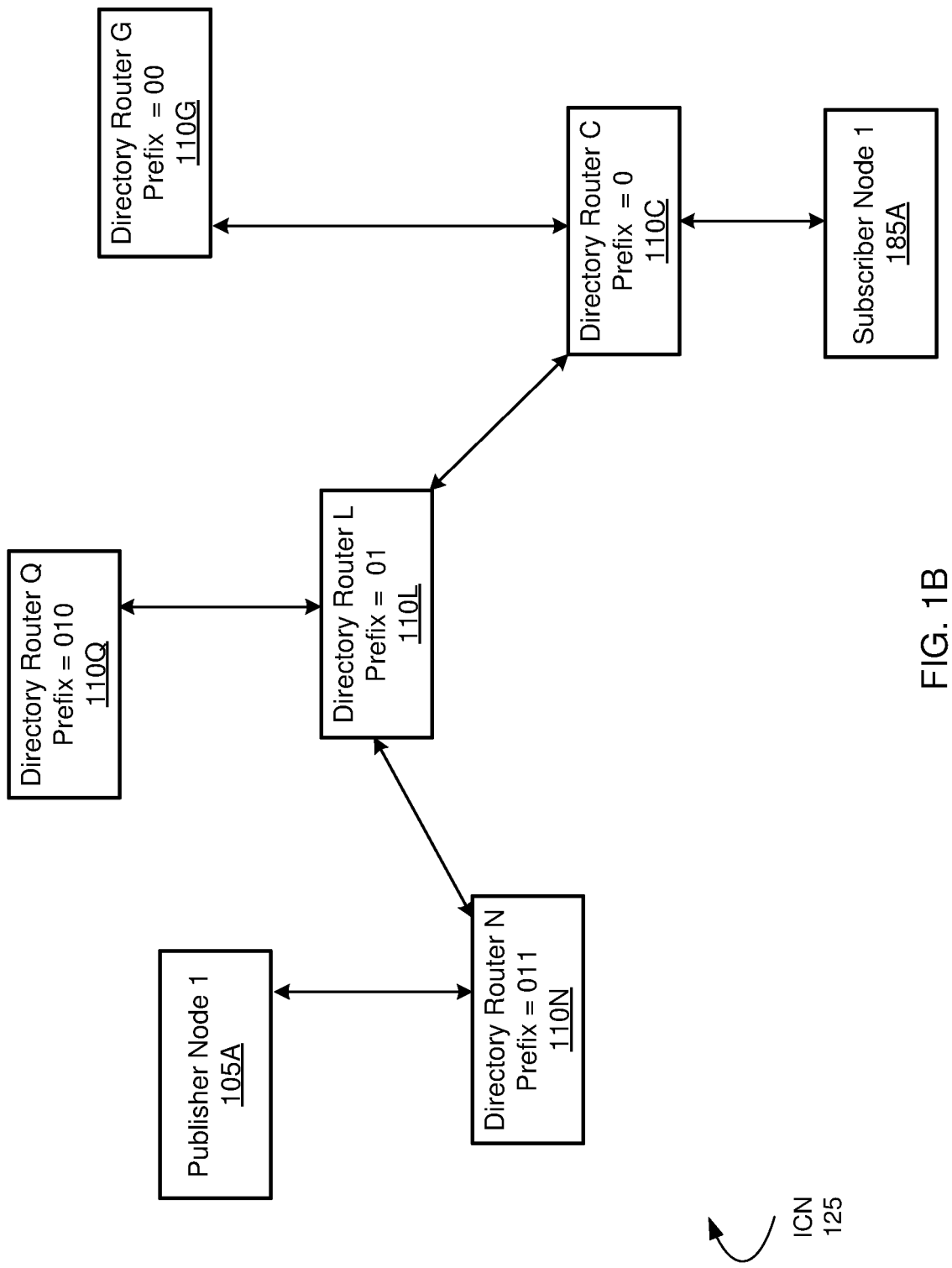
Figure 2A:
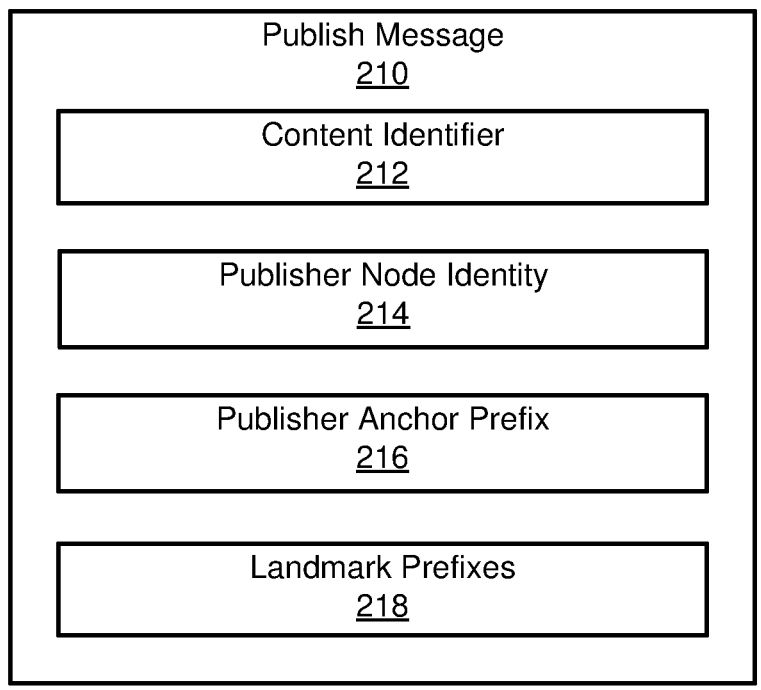
FIGS. 2A and 2B show messages exchanged within an ICN in accordance with one or more embodiments of the invention.

FIG. 1B shows the ICN (125) in accordance with one or more embodiments of the invention. As shown in FIG. 2A, the ICN (125) includes multiple directory routers (i.e., directory router C (110C), directory router G (110G), directory router L (110L), directory router Q (110Q), directory router N (110N)). Although each directory router is shown as being directly connected to another directory router, in one or more embodiments, there are one or more intermediate (non-directory) routers in some of the paths from one directory router to another directory router (discussed below).

In one or more embodiments of the invention, the directory routers (110C, 110G, 110L, 110Q, 110N) form a hierarchy (e.g., tree). Specifically, directory router C (110C) is the root, directory router L (110L) and directory router G (110G) are both children of directory router C (110C), and directory router Q (110Q) and directory router N (110N) are both children of directory router L (110L). The hierarchy (e.g., tree) many have any number of levels and there many be any number of directory routers within a single level.

In one or more embodiments, each directory router (110C, 110G, 110L, 110Q, 110N) in the ICN (125) is labelled with a unique prefix. The prefix of a directory router includes the prefix of its parent directory router plus at least one additional digit to distinguish the directory router from its siblings. For example, directory router C (110C) is the parent of both directory router L (110L) and directory router G (110G). The prefix of directory router C (110C) is "0". The prefix of directory router G (110G) is "00", while the prefix of directory router L (110L) is "01". The initial "0" in "00" and "01" is the prefix of parent directory router C (110C).

As another example, the directory router L (110L) is the parent of both directory router Q (110Q) and directory router N (110N). The prefix of directory router L (110L) is "01" The prefix of directory router Q (110Q) is "010", while the prefix of directory router N (110N) is "011". The initial "01" in "010" and "011" is the prefix of directory router L (110L).

A directory router (110C, 110G, 110L, 110Q, 110N) is aware of the prefix assigned to its parent directory router and the prefix assigned to one or more of its child directory routers. A directory router (110C, 110G, 110L, 110Q, 110N) may also be aware of the prefixes assigned to some other directory routers in the ICN (126) (i.e., directory routers other than its parent or children). In one or more embodiments, when each directory router (110C, 110G, 110L, 110Q, 110N) is labeled with a prefix, prefix routing may be utilized to exchange messages between directory routers and/or hosts.

In one or more embodiments, in prefix routing, the directory router in possession of the message ("possession directory router") compares the prefix of the destination directory router ("destination prefix"), as specified within the message, with the prefixes of directory routers known to the possession directory router. The possession directory router may send the message to the known directory router with the prefix that best matches the destination prefix. In one or more embodiments, the best matching prefix is the prefix that has the most overlap with destination prefix in the message. If there is no overlap between the destination prefix and the prefixes known to the possession directory router, the possession directory router may send the message to its parent directory router.

In one or more embodiments of the invention, one or more of the directory routers (110C, 110G, 110L, 110Q, 110N) maintain authoritative code ranges. Each code range is an interval of real numbers (e.g., whole numbers) and there is no overlap between code ranges. An authoritative code range may be assigned to a directory router. Moreover, a directory router (110C, 110G, 110L, 110Q, 110N) may assign (e.g., delegate) some or all of its code range to one or more child directory routers.

For example, directory router C (110C) may be assigned the code range [0, 255]. Directory router C (110C) may then assign code range [0, 150] to child directory router L (110L) and code range [201-255] to child directory router G (110G), while keeping code range [151, 200] for itself. Directory router L (110L) may assign code range [0-50] to child directory router N (110N) and assign code range [51-99] to child directory router Q (110Q), while keeping code range [100-150] for itself. None of the assigned code ranges overlap.

During establishment of the ICN (125), each directory router may initially assume it is a parent directory router has the prefix "0". However, as each directory router discovers other directory routers, the parent-child hierarchy will start to form. For example, for directory routers x and y, x is a parent to y if lexicographically |identity of x|<|identity of y|.

As discussed above, each publisher node (105A, 105B, 105R) publishes one or more content items for consumption by one or more subscriber nodes (185A, 185B, 185C). Each content item is associated with an identifier. The identifier may be a name of the content item (e.g., dog.jpg). Additionally or alternatively, the identifier may be a URL or include directory information of the content item (e.g., website.com/directory/sub-directory/newDocument.pdf).

In one or more embodiments of the invention, one or more of the directory routers (110C, 110G, 110L, 110Q, 110N) are configured to generate a bidirectional code from the identifier of a content item. In other words, one or more of the directory routers (110C, 110G, 110L, 110Q, 110N) execute a function, where the input to the function is the identifier of the content item and the output of the function is the bidirectional code. The bidirectional code may be a 1-dimensional (1D) numerical value. Each bidirectional code will fall within one and only one of the assigned code ranges. If two identifiers are similar (e.g., two content items with similar file names), the corresponding bidirectional codes will be a short distance apart. The bidirectional code may be a space filling curve code (e.g., Hilbert space filling curve code). The function used to calculated the bidirectional code may be changed at any time.

In one or more embodiments, the bidirectional codes and the assigned authoritative code ranges enable interval routing within the ICN (125). Specifically, if a message is associated with a bidirectional code, and if the directory router in possession of the message has assigned an authoritative code range that includes the bidirectional code to a child directory router, the directory router may forward the message to the child directory router. Otherwise, if a message is associated with a bidirectional code, and if the directory router in possession of the message has neither assigned an authoritative code range that includes the bidirectional code to a child directory router nor maintains an authoritative code range that includes the bidirectional code, the directory router may forward the message to its parent directory router. The process may repeat until the directory router in possession of the message is also the directory router that maintains the authoritative code range that includes the bidirectional code. In one or more embodiments, at any given time, the bidirectional code with fall within one and only one code range (i.e., the bidirectional code falls outside all but one of the code ranges).

In one or more embodiments, when the ICN (125) is being established, each directory router assumes it is the authoritative directory router for the entire bidirectional code space. However, once the hierarchy of directory routers is formed, each directory router will become the authoritative directory router only for the portion of the code space assigned to the directory router by its parent directory router.

Figure 1C:
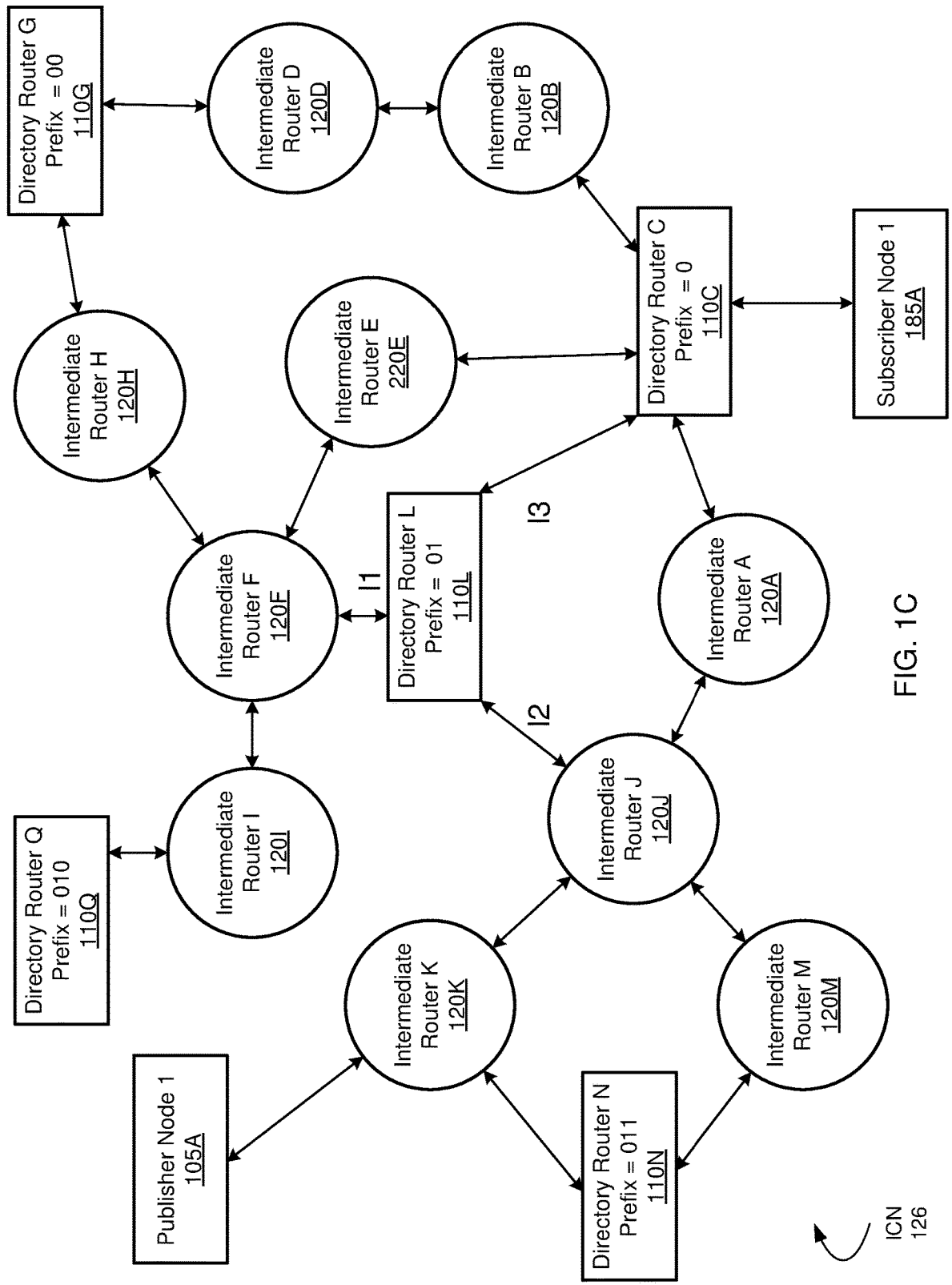

FIG. 1C shows the ICN (126) in accordance with one or more embodiments of the invention. The ICN (126) is similar to ICN (125), discussed above in reference to FIG. 1A and FIG. 1B. As shown in FIG. 1C, the ICN (126) includes one or more intermediate routers (i.e., intermediate router A (120A), intermediate router B (120B), intermediate router D (120D), intermediate router E (220E), intermediate router F (120F), intermediate router H (120H), intermediate router I (120I), intermediate router J (120J), intermediate router K (120K), intermediate router M (120M)) along the path linking one directory router to another directory router. Moreover, one or more intermediate routers may also be along the path linking a host (e.g., publisher node 1 (105A)) to a directory router.

In one or more embodiments, a host (e.g., publisher node 1 (105A), subscriber node 1 (185A)) registers its presence with one of the directory routers. Following registration, the directory router becomes the anchor directory router for the host. In one or more embodiments, a directory router must be within a threshold number of hops (e.g., 2 hops) from the host in order to be an anchor directory router for the host. For example, in FIG. 1C, directory router N (110N) is the anchor directory router for publisher node 1 (105A), while directory router C (110C) is the anchor directory router for subscriber node 1 (185A). Moreover, the prefix of an anchor directory router may be referred to as the anchor prefix.

In one or more embodiments of the invention, nearby directory routers known to a host are referred to as landmark directory routers. For example, in FIG. 1C, directory router L (110L) is a landmark directory router for publisher node 1 (105A). In one or more embodiments, the anchor directory router for a host is also considered a landmark directory router for the host. The prefix of a landmark directory router may be referred to as a landmark prefix.

As discussed above, each content item is associated with an identifier, and each directory router is configured to generate a bidirectional code from the identifier. As also discussed above, one or more of the directory routers (110C, 110G, 110L, 110Q, 110N) maintain non-overlapping code ranges. If the bidirectional code for a content item falls within the code range maintained by a directory router, the directory router may be referred to as the authoritative directory router for the bidirectional code. The authoritative directory router may be different from the anchor directory router and also different from the landmark directory router. For example, in FIG. 1C, directory router N (110N) is the anchor directory router for publisher node 1 (105A), directory router L (110L) is one landmark directory router for publisher node 1 (105A), and director router G (110G) may be the authoritative directory router for a content item published by publisher node 1 (105A) (i.e., the bidirectional code for the content item falls within the code range maintained by directory router G (110G)).

In one or more embodiments of the invention, a single directory router may simultaneously operate as an authoritative director router for a code range, an anchor directory router for one or more hosts, and a landmark directory router for one or more hosts. A message that transits the ICN (126) may pass multiple directory routers. These directory routers along the transit path may be referred to as intermediate directory routers.

In one or more embodiments, each directory router (110C, 110G, 110L, 110N, 110Q) and each intermediate router (120A, 120B, 120D, 120E, 120F, 120H, 120I, 120J, 120K, 120M) include one or more interfaces. An interface is a direct connection or path to a neighbor router or host. For example, directory route L (110L) has three interfaces: I1, I2, I3. I1 connects directory router L (110L) to intermediate router F (120F). I2 connects directory router L (110L) to intermediate router J (120J). I3 connects directory router L (110L) to directory router C (110C).

FIG. 2A shows a publish message (210) in accordance with one or more embodiments of the invention. The publish message (210) may be generated by a publisher node when the publisher node is ready to publish a content item. The publish message (210) may also be generated by another directory router temporarily caching the content item (discussed below). As shown in FIG. 2A, the publish message may include multiple fields including the content identifier (212), the publisher node identity (214) (e.g., name given to publisher node, serial number of publisher node, etc.), the publisher anchor prefix (216) (i.e., the prefix for the anchor directory router of the publisher node), and one or more landmark prefixes (218) (i.e., the prefixes of the landmark directory routers, if any, known to the publisher node when the publish message (210) is generated). The publish message (210) may include additional data (not shown) including a random pseudo number (i.e., nonce) to prevent replay attacks and a sequence number to keep track of subsequent update messages. The publish message (210) may traverse the ICN (126) through interval routing. In one or more embodiments, the destination of the publish message (210) is the authoritative directory router maintaining the code range that includes the bidirectional code for content identifier (212) (discussed below).

Figure 2B:
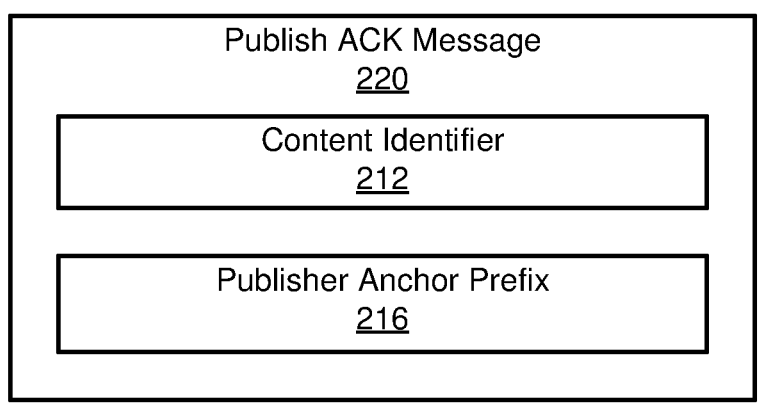

FIG. 2B shows a publish acknowledgment (ACK) message (220) in accordance with one or more embodiments of the invention. The publish acknowledgement message (220) may be generated by an authoritative directory router in response to the publish message (210). The publish ACK message (220) has multiple fields including the content identifier (220) and the publisher anchor prefix (216) from the publish message (210). The publish ACK message (220) may also include additional data related a nonce and a sequence number (not shown). The destination of the publish ACK message (220) is the anchor directory of the publisher node. Accordingly, the publish ACK message (220) may be routed through the ICN (126) using prefix routing, the link cost repositories (discussed below), and the publisher anchor prefix (216).

Figure 3A:
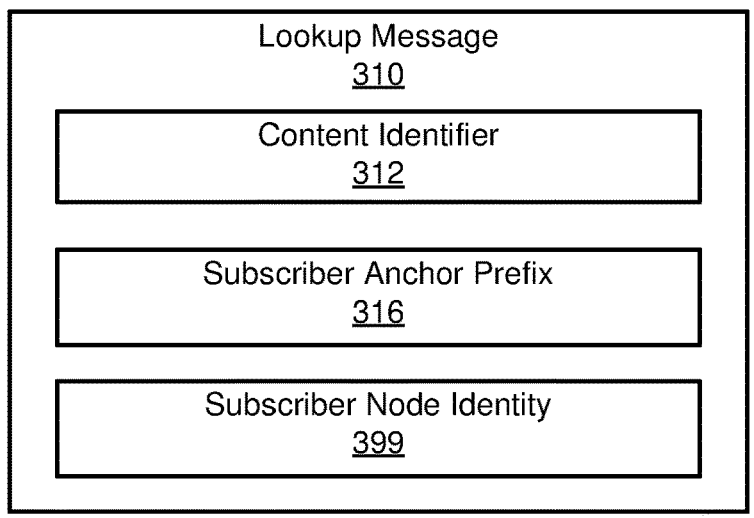
FIG. 3A and FIG. 3B show messages exchanged within an ICN in accordance with one or more embodiments of the invention.

FIG. 3A shows a lookup message (310) in accordance with one or more embodiments of the invention. As shown in FIG. 3A, the lookup message (310) may be generated by a subscriber node seeking a content item. As shown in FIG. 3A, the lookup message (310) includes the identifier (312) of the requested content item, the subscriber anchor prefix (316) (i.e., the prefix of the anchor directory router for the subscriber node), and the identity (399) of the subscriber node. The lookup message (310) may also include additional data (not shown) related to a nonce and sequence number. The lookup message (310) may traverse the ICN (126) through interval routing, and the destination of the lookup message (310) may be the authoritative directory router maintaining the code range that includes the bidirectional code for content identifier (312) (discussed below).

Figure 3B:
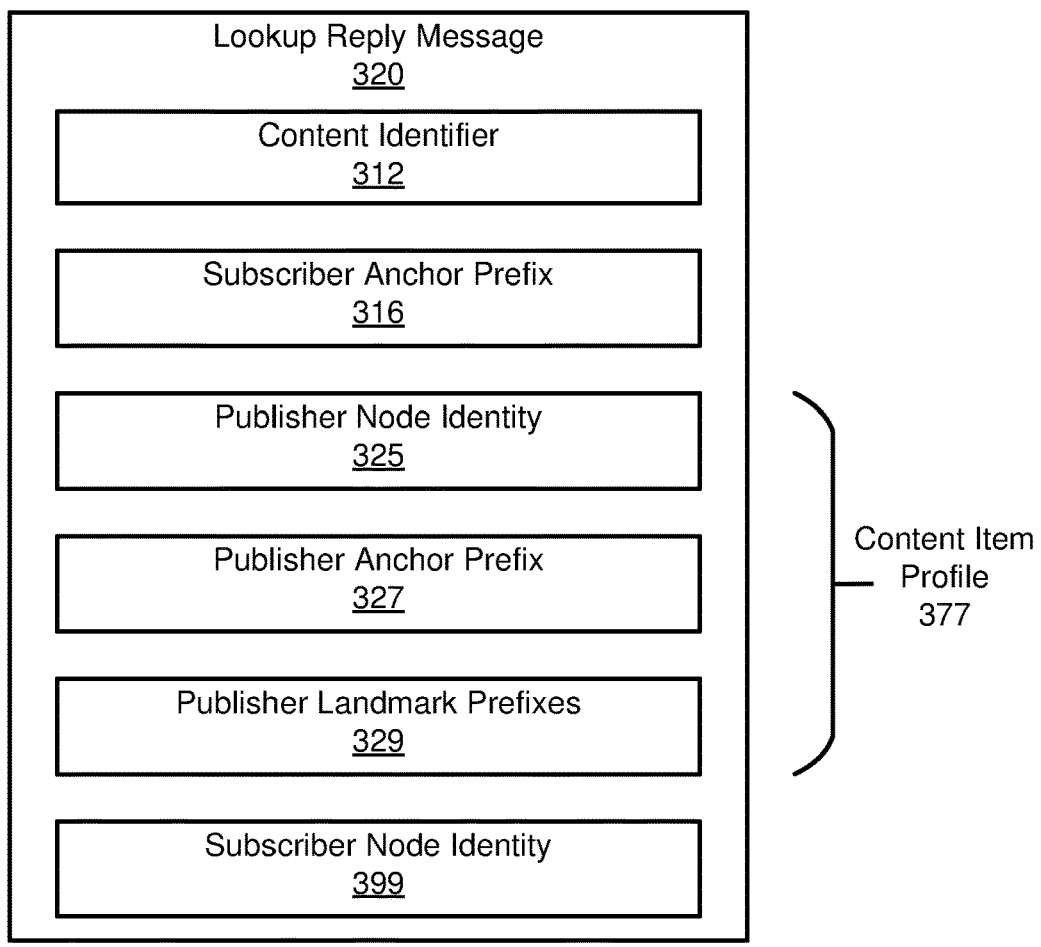

FIG. 3B shows a lookup reply message (320) in accordance with one or more embodiments of the invention. The lookup reply message (320) may be generated by an authoritative directory router (or another directory router) in response to the lookup message (310). The lookup reply message (320) has multiple data items from the lookup message (310) including the content identifier (312), the subscriber anchor prefix (316), and the subscriber node identity (399). The lookup reply message (320) also includes the identity of the publisher node that published the requested content item (325), the publisher anchor prefix (327) (i.e. the prefix for the anchor directory router of the publisher node), and publisher landmark prefixes (329) (i.e., prefixes for landmark directory routers known to the publisher node). The data structure (e.g., n-tuple) including the publisher node identity (325), the publisher anchor prefix (327), and the publisher landmark prefixes (329) may be referred to a content item profile (377).

In one or more embodiments, the requested content item may be published by multiple publisher nodes. In such scenarios, there may be multiple instances of the content item profile (377) in the lookup reply message (320), which with each instance corresponding to one of the multiple publisher nodes.

In one or more embodiments, the lookup reply message (320) includes additional data (not shown) including a nonce and sequence number. The final destination of the lookup reply message (320) may be the subscriber node that generated the lookup message (310). Accordingly, the lookup reply message (320) may be routed through the ICN (126) to the subscriber anchor directory using prefix routing, the link cost repositories (discussed below), and the subscriber anchor prefix (316) in the lookup reply message (320). The subscriber anchor directory may then route the lookup reply message (320) (or at least some of its data) to the subscriber node based on the subscriber node identity (399) in the lookup reply message (320). Additionally or alternatively, a router close to the subscriber node may redirect the lookup reply message (320) to the subscriber node bypassing the anchor directory router for the subscriber node.

Figure 4A:
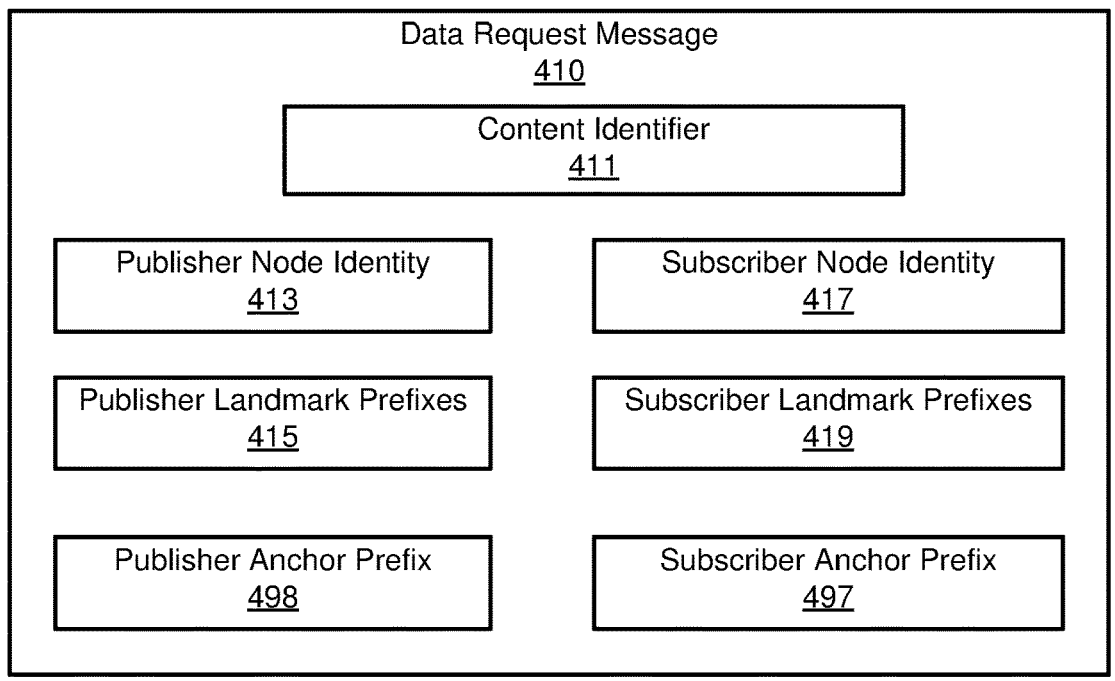
FIG. 4A and FIG. 4B show messages exchanged within an ICN in accordance with one or more embodiments of the invention.

FIG. 4A shows a data request message (410) in accordance with one or more embodiments of the invention. The data request message (410) may be generated by a subscriber node based on the data in the lookup reply message (320). As shown in FIG. 4A, the data request message (410) includes an identifier (411) of the content item, an identity (413) of the publisher node that published the requested content item, publisher landmark prefixes (415) (i.e., prefixes of the landmark directory routers known to the publisher node), the publisher anchor prefix (498) (i.e., prefix of the anchor directory router for the publisher node), the identity of the subscriber node (417) generating the data request message (410), subscriber landmark prefixes (419) (i.e., prefixes of the landmark directory routers known to the subscriber node when the data request message (410) was generated), and the subscriber anchor prefix (497) (i.e., the prefix of the anchor directory router for the subscriber node). In one or more embodiments, the data request message (410) includes additional data (not shown) including a nonce and sequence number.

The intended destination of the data request message (410) is one of the publisher nodes for the content item. Accordingly, the data request message (420) may be routed through the ICN (126) to the publisher anchor directory router or one of the publisher landmark directory routers using prefix routing, the link cost repositories (discussed below), and the publisher anchor prefix (498) or one of the publisher landmark prefixes (415) in the data request message (410). The subscriber node may forward the data request message to the most suitable immediate neighbor router, which might or might not be the anchor directory for the subscriber node, in the direction of the publisher anchor prefix (498) or one or more of the publisher landmark prefixes (415). Upon eventual receipt of the data request message (410), the publisher anchor directory router (or landmark directory router) may then route the data request message (410) (or at least some of its data) to the publisher node based on the publisher node identity (413). Additionally or alternatively, a router close to the publisher node may redirect the data request message (410) to the publisher node bypassing the publisher anchor directory router and/or the publisher landmark directory routers.

Figure 4B:
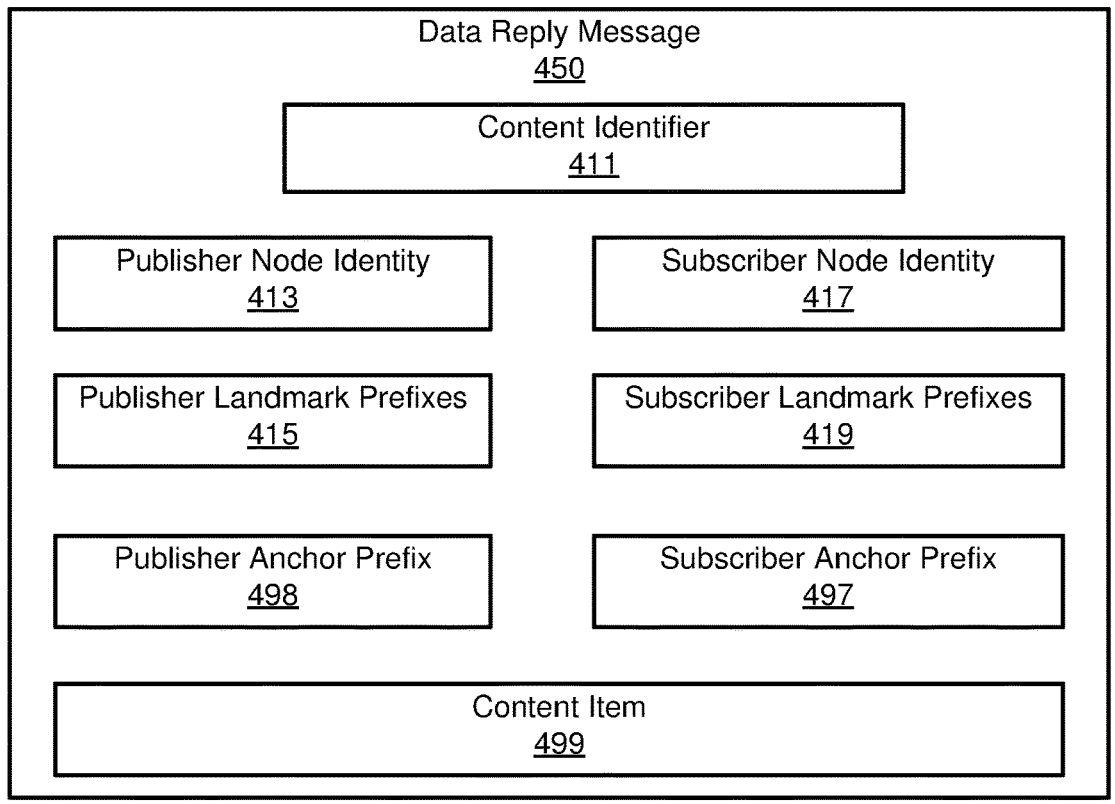

FIG. 4B shows a data reply message (450) in accordance with one or more embodiments of the invention. The data reply message (450) may be generated by the publisher node based on the data in the data request message (410). As shown in FIG. 4B, the data reply message (450) includes much of the data from the data request message (410). However, the data reply message (450) also includes the content item (499) itself.

The intended destination of the data reply message (450) is the subscriber node that requested the content item (499). Accordingly, the data reply message (450) may be routed through the ICN (126) to the subscriber anchor directory router or one of the subscriber landmark directory routers using prefix routing, the link cost repositories (discussed below), and the subscriber anchor prefix (497) or one of the subscriber landmark prefixes (419) in the data reply message (450). The publisher node may forward the data reply message to the most suitable immediate neighbor router, which might or might not be the anchor directory for the publisher node, in the direction of the subscriber anchor prefix (497) or one or more of the subscriber landmark prefixes (419). Upon eventual receipt of the data reply message (450), the subscriber anchor directory router (or subscriber landmark directory router) may then route the data reply message (450) (or at least some of its data) to the subscriber node based on the subscriber node identity (417). Additionally or alternatively, a router close to the subscriber node may redirect the data reply message (450) to the publisher node bypassing the subscriber anchor directory router and/or the subscriber landmark directory routers.

Unlike other ICN networks that rely on large Forward Information Base and Pending Interest Tables, the data request message (410) and the data reply message (450) include landmark directory prefixes (415, 419) (which include anchor directory prefixes) that aid in scalable, robust, and efficient routing at each hop. In other words, the ICN (126) does not require Forward Information Base and Pending Interest Tables.

FIG. 5A shows a directory router (510) in accordance with one or more embodiments of the invention. The directory router (510) may correspond to any of the directory routers (110C, 110G, 110L, 110N, 110Q) discussed above in reference to FIG. 1B. As shown in FIG. 5A, the directory router (510) has multiple repositories. These repositories may be implemented using any type of data structure (e.g., tables, linked lists, databases, etc.).

In one or more embodiments, the link cost repository (511) has multiple entries. One or more entries may include the identity of another directory router, the prefix of the other directory router, the number of hops required to reach the other directory router from the directory router (510), the next router in the path to reach the other directory router (i.e., there is a direct connection between the next router and the directory router (510)), and the interface connecting the directory router (510) to the next router. Additionally, one or more entries may include the identity of a host (i.e., publisher node or subscriber node), the number of hops required to reach the host, the next router in the path to reach the host, and the interface connecting the directory router (510) to the next router.

FIG. 5B shows an example of the link cost repository (511). Specifically, FIG. 5B may be the link cost repository in directory router L (110L), discussed above in reference to FIG. 1B and FIG. 1C. As shown in FIG. 5B, in order to forward a message (e.g., publish message, publish ACK message, lookup message, lookup reply message, data request message, data reply message, etc.) to publisher node 1 (105A), the message can be forwarded to intermediate router J (120J), which is directly connected to directory router L (110L) via interface I2. The message would then be forwarded by intermediate router J (120J) to intermediate router K (120K), and then forwarded by intermediate router K (120K) to publisher node 1 (105A).

As also shown in FIG. 5B, in order to forward a message to directory router C (110C), there are two options known to directory router L (110L). One option requires 1 hop ("shorter path"), the other option requires 3 hops ("longer path"). For the shorter path, the message can be forwarded via interface I3, which directly connects directory router L (110L) with directory route C (110C). For the longer path, the message can be forwarded to intermediate router F (120F), which is directly connected to directory router L (110L) via interface I1. The message would then be forwarded by intermediate router F (120F) to intermediate router E (120E), and then forwarded by intermediate router E (120E) to directory router C (110C). In one or more embodiments, when there are multiple paths to the same destination, the path with the smallest number of hops is utilized. If there are multiple paths of equal hops, a path may be selected at random.

Though skilled in the art, having the benefit of this detailed description, will appreciate that the link cost repository of any router may be generated and updated via the router broadcasting HELLO messages.

Returning to FIG. 5A, in one or more embodiments, the directory router (510) includes the interval repository (515). The interval repository stores the one or more code ranges being maintained by the directory router. In other words, the directory router (510) is the authoritative directory router for the code ranges in the interval repository (515). In one or more embodiments, the interval repository (515) also stores the code ranges, if any, that have been delegated to the child directory routers.

In one or more embodiments, the local routing repository (515) stores the content item identifier and the publisher node identity extracted from each publish message received by the directory router (510), even if the directory router (510) is not the authoritative directory for the bidirectional code corresponding to the content item. Entries in the local routing repository (515) may be used to respond to lookup request messages obtained by the directory router (510) even if the directory router (510) is not the authoritative directory router.

In one or more embodiments, the local code repository (517) stores the content item identifier, the publisher node identity, the publisher anchor prefix, and the publisher landmark prefixes extracted from some of the publish messages received by the directory router (510) (discussed below). As discussed above in reference to FIG. 3B, the publisher node identity, the publisher anchor prefix, and the publisher landmark prefixes together may be referred to as a content item profile. In one or more embodiments, there are multiple publisher nodes for the same content item. In such embodiments, there may be multiple content item profiles stored in the local code repository (517) for the same content item, each corresponding to a different publisher node, it's anchor directory, and it's landmark prefixes.

In one or more embodiments, entries in both the local routing repository (515) and the local code repository (517) expire. However, entries in the local routing repository (515) expire much faster than entries in the local code repository (517).

In one or more embodiments of the invention, the directory router (510) includes the content items cache (519). Upon obtaining a data reply message, the content items cache (519) may store a copy of the content item in the data reply message, even if the directory router (510) is not the intended destination of the data reply message (e.g., the directory router (510) is an intermediate directory router). For example, if the directory router (510) obtains a threshold number of data reply messages with the same content item, this indicates there is great demand for the content item, and the directory router (510) may store a copy of the content item in the content items cache (519). In such scenarios, the directory router (510) may generate and forward its own publish message for the content item, effectively becoming, at least temporarily, another publisher node for the content item. This additional publish message may include the prefix of the intermediate directory router and the prefixes of one or more landmark directory routers known to the intermediate directory router. This is an example of opportunistic caching.

Figure 5C:
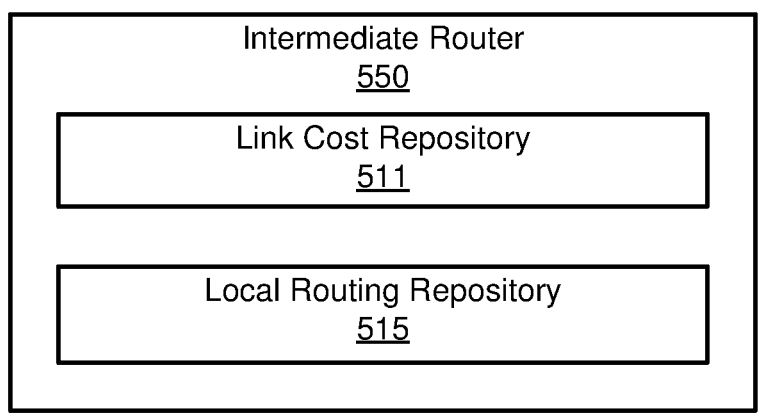

FIG. 5C shows an intermediate router (550) in accordance with one or more embodiments of the invention. The intermediate router (550) may correspond to any of the intermediate routers (120A, 120B, 120D, 120E, 120F, 120H, 120I, 120J, 120K, 120M) discussed above in reference to FIG. 1C. As shown in FIG. 5C, the intermediate router (510) has multiple repositories. These repositories may be implemented using any type of data structure (e.g., tables, linked lists, databases, etc.). Link cost repository (511) and the local routing repository (515) in the intermediate router (550) are similar to those in the directory router (510). Further, each publisher node and/or subscriber node itself may have their own link cost repository.

Figure 6:
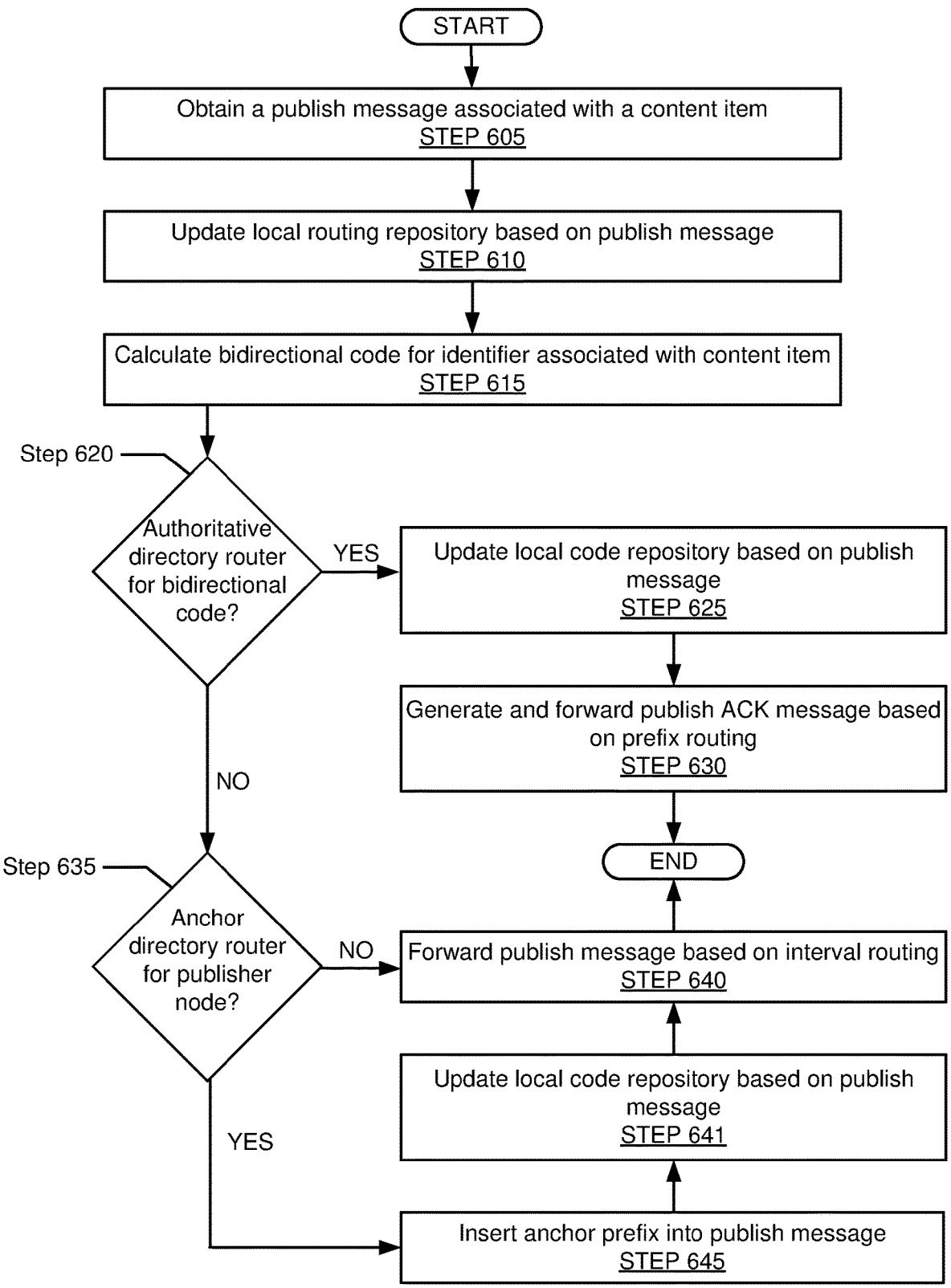
FIG. 6 and FIG. 7 show flowcharts in accordance with one or more embodiments of the invention.

FIG. 6 shows a flow chart in accordance with one or more embodiments of the invention. The process depicted in FIG. 6 may be performed by one of the directory routers, discussed above in reference to FIG. 1B. In one or more embodiments, one or more of the steps shown in FIG. 6 may be omitted, repeated, and/or performed in a different order than the order shown in FIG. 6. Accordingly, the scope of the present disclosure should not be considered limited to the specific arrangement of steps shown in FIG. 6.

Initially, the directory router obtains a publish message (STEP 605). The publish message may have been generated by a publisher node to register a content item (i.e., make the content item available to subscriber nodes). As discussed above, the publish message includes the identifier of a content item, the identity of the publisher node, and possibly publisher landmark prefixes (i.e., prefixes for landmark directory routers known to the publisher node when the publish message was generated).

In STEP 610, the local routing repository of the directory router is updated. Updating the local routing repository may include extracting the publisher node identity and the identifier of the content item being published by the publish node, and then storing these extracted data elements in the local routing repository.

In STEP 615, a bidirectional code for the content item identifier is calculated. As discussed above, the identifier may be a name of the content item (e.g., dog.jpg). Additionally or alternatively, the identifier may be a URL or include directory information of the content item (e.g., website.com/directory/sub-directory/newDocument.pdf). The bidirectional code is a 1D numerical value for the identifier. For example, the bidirectional code may correspond to a space filling curve code (e.g., Hilbert space filling curve code).

In STEP 620, it is determined whether the directory router is the authoritative directory router for the bidirectional code. In other words, if the directory router maintains an authoritative code range, it is determined whether the bidirectional code falls within the code range. When it is determined that the bidirectional code falls with the authoritative code range managed by the directory router, and thus the directory router is the authoritative directory router for the bidirectional code, the process proceeds to STEP 625. When it is determined that the bidirectional code falls outside the code range managed by the directory router (or the directory router does not manage any code range), the directory router is not the authoritative directory router for the bidirectional code, and the process proceeds to STEP 635. Code ranges managed by the directory router may be stored in the directory router's interval repository.

In STEP 625, the local code repository is updated based on the publish message. Updating the local code repository may include extracting the publisher node identity, the identifier of the content item, the publisher anchor prefix, and the publisher landmark prefixes from the publish message, and storing these items in the local code repository. The data structure (e.g., n-tuple) including at least the publisher node identity, the publisher anchor prefix, and the publisher landmark prefixes, if any, may be referred to as the content item profile and it is this data structure (e.g., n-tuple) that is stored in the local code repository with the content item identifier.

In STEP 630, a publish ACK message is generated. The publish ACK message includes the identifier associated with the content item and the publisher anchor prefix from the publish message. The directory router may forward the publish ACK message using the publisher anchor prefix and prefix routing. Specifically, the directory router includes include a link cost repository (discussed above), showing paths to one or more directory routers and the prefixes of the directory routers. The publish ACK message may be forwarded to the directory router with the prefix best matching the publish anchor prefix in the publish ACK message. The publish ACK message may continue to be routed until it reaches the anchor directory router for the publisher (i.e., the anchor directory router labeled with the publisher anchor prefix).

In STEP 635, it is determined whether the directory router is the anchor directory router for the publisher node. In one or more embodiments, the directory router maintains a data structure (e.g., table) of publisher nodes for which the directory router acts as an anchor directory. When it is determined that the directory router is not the anchor directory router for the publisher node, the process proceeds to STEP 640. When it is determined that the directory router is the anchor directory router for the publisher node, the process proceeds to STEP 645.

In STEP 645, the directory router, which has now been determined to also be the anchor directory router for the publisher node, inserts its prefix (i.e., publisher anchor prefix) into the publish message. The directory router may also generate and send a publish ACK message to the publisher node.

In STEP 641, the local code repository is updated based on the publish message. STEP 641 is essentially the same as STEP 625. In STEP 640, the directory router forwards the publish message based on interval routing. Specifically, if directory router was never assigned a code range that included the bidirectional code, then the directory router forwards the publish message to its parent directory router. If the directory router previously assigned a code range including the bidirectional code to a child directory router, the directory router forwards the publish message to the child directory router.

Those skilled in the art, having the benefit of this detailed description, will appreciate that the process shown in FIG. 6 may be executed by each directory router in the ICN that obtains the publish message. Those skilled in the art, having the benefit of this detailed description, will also appreciate that by updating the local code repository of both the anchor directory router (STEP 641) and the authoritative directory router (STEP 625) based on the publish message, the content item will remain registered with the ICN even if either the anchor directory router or the authoritative directory router is disconnected from the ICN.

In one or more embodiments, multiple publisher nodes may publish the same content item with the same identifier. In such embodiments, the authoritative directory router for the bidirectional code corresponding to the identifier may receive multiple publish messages. Accordingly, the local code repository have multiple content item profiles (i.e., multiple, publisher node identities, multiple anchor prefixes, and multiple sets of landmark prefixes) for a single content item identifier.

In one or more embodiments of the invention, a directory router that is neither the authoritative directory router nor the anchor directory router (e.g., intermediate directory router) still updates its local code repository based on the publish message (i.e., stores a content item profile in its local code repository for the content item referenced in the publish message). This is an example of opportunistic caching. For example, if the directory router obtains a threshold number of publish messages with the same content identifier, the directory router may start updating its local code repository based on future publish messages with the same content identifier. As another example, if the directory router obtains a threshold number of publish messages generated by the same publisher node for the same or different content items, the directory router may start updating its local code repository based on future publish messages generated by the publisher node. This too is an example of opportunistic caching. Additionally, the directory router may look for other patterns or consider other policies that trigger opportunistic caching.

It is possible that one or more directory routers in the ICN may fail and/or be removed at any time. In one or more embodiments of the invention, routers including directory routers periodically or sporadically broadcast HELLO messages. These HELLO messages may be used to assign new prefixes to the remaining directory routers (i.e., the directory routers still in the ICN). In one or more embodiments of the invention, a publisher node republishes its content items periodically or sporadically using the process (or a similar process) shown in FIG. 6. By republishing the content items, this ensures all the prefixes (e.g., prefixes of anchor directory routers, prefixes of landmark directory routers, etc.) in the content item profiles stored in local code repositories are updated with the newly assigned prefixes.

Figure 7:
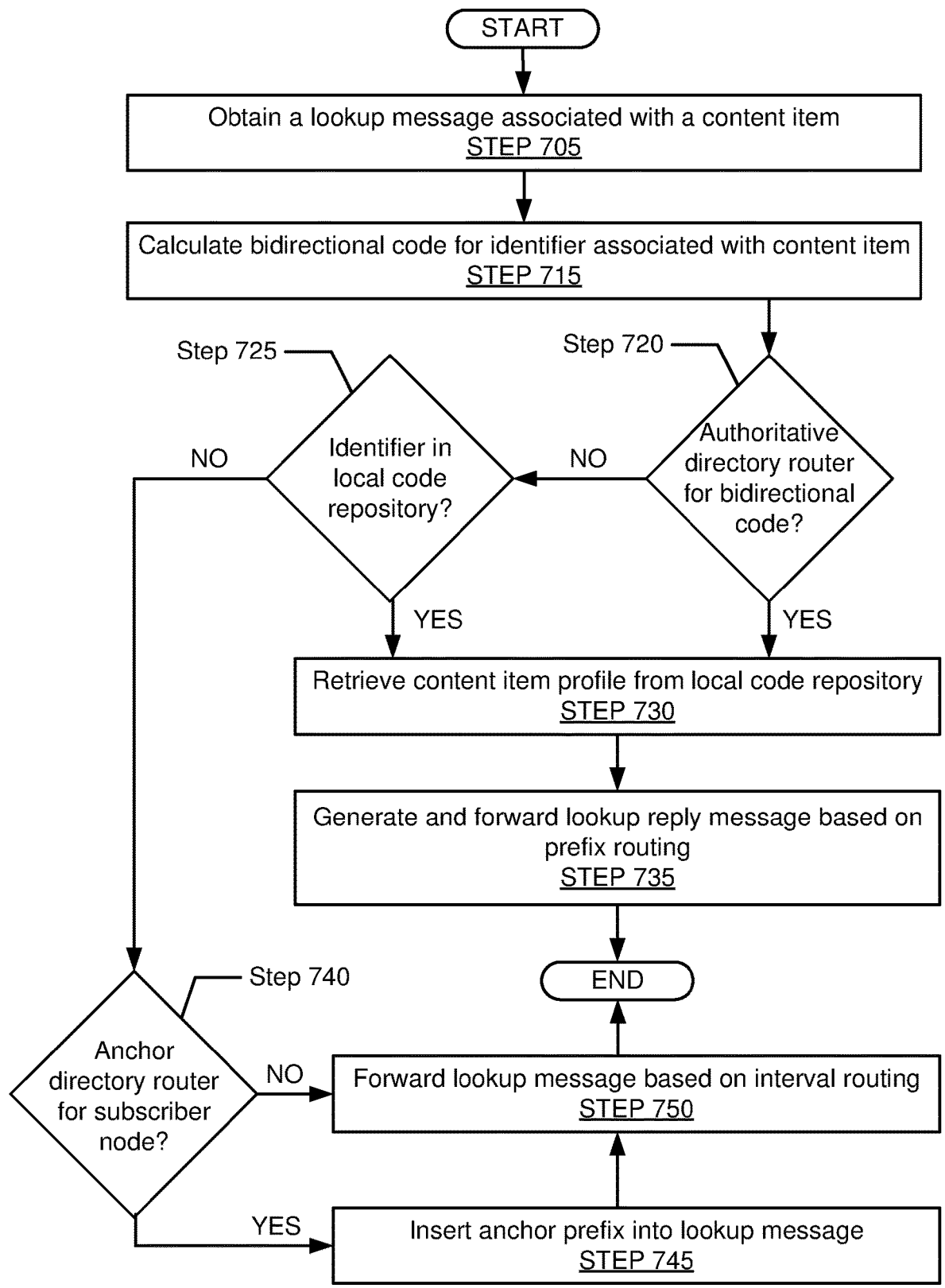

FIG. 7 shows a flow chart in accordance with one or more embodiments of the invention. The process depicted in FIG. 7 may be performed by one of the directory routers, discussed above in reference to FIG. 1B. In one or more embodiments, one or more of the steps shown in FIG. 7 may be omitted, repeated, and/or performed in a different order than the order shown in FIG. 7. Accordingly, the scope of the present disclosure should not be considered limited to the specific arrangement of steps shown in FIG. 7. One or more steps in FIG. 7 may be performed after the process shown in FIG. 6 is executed.

Initially, a lookup message is obtained (STEP 705). The lookup message may be generated by a subscriber node seeking a content item. The lookup message may include the identity of the subscriber node, the subscriber anchor prefix (i.e., the prefix for the anchor directory router of the subscriber node), and the identifier of the content item.

In STEP 715, the bidirectional code for the identifier is calculated. The bidirectional code is a 1D numerical value for the identifier. For example, the bidirectional code may correspond to a space filling curve code (e.g., Hilbert space filling curve code).

In STEP 720, it is determined whether the directory router is the authoritative directory router for the bidirectional code. In other words, if the directory router maintains a code range, it is determined whether the bidirectional code falls within the code range. When it is determined that the bidirectional code falls with the code range managed by the directory router, and thus the directory router is the authoritative directory router for the bidirectional code, the process proceeds to STEP 730. When it is determined that the bidirectional code falls outside the code range managed by the directory router (or the directory router does not manage any code range), the directory router is not the authoritative directory router for the bidirectional code, and the process proceeds to STEP 725. Code ranges managed by the directory router may be stored in the directory router's interval repository.

In STEP 725, it is determined whether the identifier of the content item is in the local code repository of the directory router. For example, if the directory router is the anchor directory for the publisher node that published the content item then the content item identifier is likely to be in the local code repository (discussed above in reference to STEP 641 of FIG. 6). When it is determined that the local code repository includes the content item identifier the process proceeds to STEP 730. When it is determined that the local code repository does not include the content item identifier, the process proceeds to STEP 740.

In STEP 730, one or more content item profiles corresponding to the content item identifier are retrieved from the local code repository. Each content item profile may be an n-tuple (or another data structure) with at least the identity of a publisher node of the content item, the publisher anchor prefix, and the publisher landmark prefixes, if any.

In STEP 735, a lookup reply message is generated. The lookup reply message may include the content item identifier and the subscriber anchor prefix, as extracted from the lookup message. The lookup reply message also includes the one or more content item profiles retrieved from the local code repository. The directory router forwards the lookup reply message based on the subscriber anchor prefix and prefix routing. Specifically, the directory router includes include a link cost repository, discussed above, showing paths to one or more directory routers and the prefixes of the directory routers. The lookup reply message may be forwarded to the directory router with the prefix best matching the subscriber anchor prefix. The lookup reply message may continue to be routed until it reaches the anchor directory router for the subscriber (i.e., the anchor directory router labeled with the subscriber anchor prefix) and/or the subscriber node itself.

In STEP 740, it is determined whether the directory router is the anchor directory router for the subscriber node. In one or more embodiments, the directory router maintains a data structure (e.g., table) of subscriber nodes for which the directory router acts as an anchor directory. When it is determined that the directory router is not the anchor directory router for the subscriber node, the process proceeds to STEP 750. When it is determined that the directory router is the anchor directory router for the subscriber node, the process proceeds to STEP 645.

In STEP 745, the directory router which has now been determined to be the anchor directory router for the subscriber node, inserts its prefix (i.e., subscriber anchor prefix) into the lookup message.

In STEP 750, the directory router forwards the lookup message based on the bidirectional code for the identifier and interval routing. Specifically, if directory router was never assigned a code range that included the bidirectional code, then the directory router forwards the lookup message to its parent directory router. If the directory router previously assigned a code range including the bidirectional code to a child directory router, the directory router forwards the lookup message to the child directory router.

In one or more embodiments of the invention, as the lookup reply message transits through the ICN back to the subscriber node, the lookup reply message may pass through one or more intermediate directory routers. Upon obtaining the lookup reply message, one or more of these intermediate directory routers may store a copy of the content item profile(s) from the lookup reply message, even if the directory router is not the anchor directory router for the subscriber node. For example, if the intermediate directory router obtains a threshold number of lookup messages or lookup reply messages associated with the same content item, this indicates there is great demand for the content item, and the intermediate directory router may store a copy of the content item profile(s) in its local code repository. In such scenarios, the intermediate directory router may respond to lookup messages for the content item (i.e., generate lookup reply messages) that it obtains in the future, reducing the burden on authoritative directory router associated with the content item and reducing the likelihood of success of a denial of service attack on the authoritative directory router. This too is an example of opportunistic caching.

Figure 8:
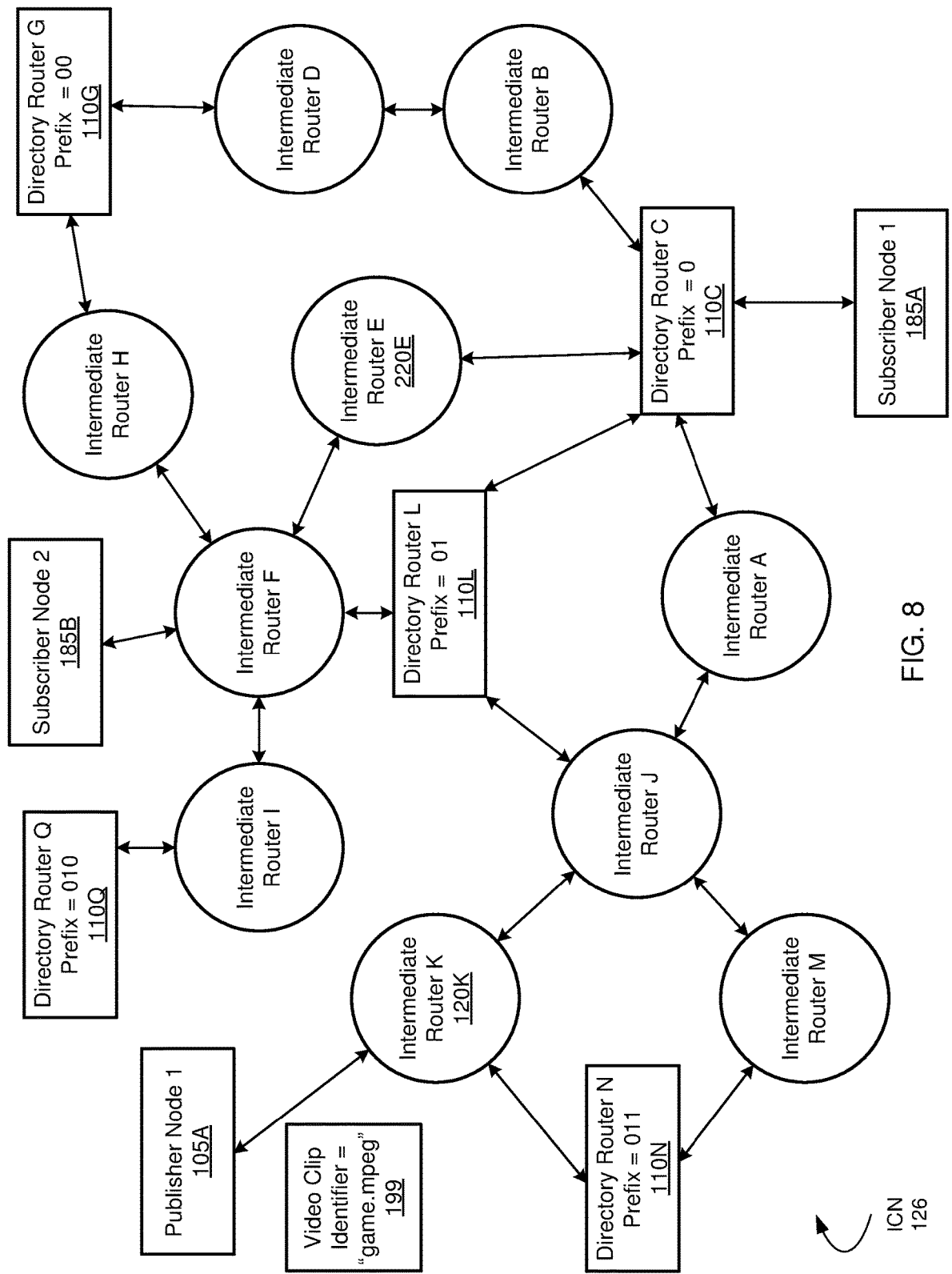
FIG. 8 shows an example in accordance with one or more embodiments of the invention.

FIG. 8 shows an example in accordance with accordance with one or more embodiments of the invention. FIG. 8 is essentially the same as FIG. 1C, except FIG. 8 also includes subscriber node 2 (185B).

In this example, directory router N (110N) is the anchor directory router for publisher node 1 (105A), directory router C (110C) is the anchor directory router for subscriber node 1 (185A), and directory router Q (110Q) is the anchor directory router for subscriber node 2 (185B). Also in this example, publisher node 1 (105A) wishes to publisher a video clip (199) with identifier "game.mpep", and directory router G (110G) is the authoritative directory router for the code range that includes the bidirectional code for "game.mpeg".

Initially, publisher node 1 (105A) generates a publish message for the video clip and forwards the publish message to its anchor directory router (i.e., directory router N (110N)). The publish message include the identifier "game.mpeg" and the identity of the publisher node "1". Directory router N (110N) inserts its anchor prefix "011" into the publish message. Directory router N (110N) also calculates the bidirectional code for "game.mpeg". Then, through interval routing, the publish message is routed to the authoritative directory router for the bidirectional code of identifier "game.mpeg" (i.e., directory router G (110G)). The route taken by the publish message (as part of the interval routing) is routers N-K-J L-C-B-D G. Along this route, directory router L (110L) and directory router C (110C) also calculate the bidirectional code for the identifier "game.mpeg" in order to perform the interval routing.

The authoritative directory router (directory router G (110G)) generates a content item profile with the publisher anchor prefix "011" and the publisher identity "0". The authoritative directory router also stores the content item profile with the content identifier "game.mpeg" into its local code repository. Further, the authoritative directory router also generates a publish ACK message with the publisher anchor prefix "011" from the publish message and the content identifier. The publish ACK message is routed back to the publisher anchor directory router (i.e., directory router N (110N)) based on prefix routing for "011". The route taken by the publish ACK message (as part of the prefix routing) is routers G-D-B-C-L-J-K-N.

At a future time, subscriber node 1 (185A) wishes to consume the video clip with identifier "game.mpeg". Accordingly, subscriber node 1 (185A) generates a lookup request including the identifier "game.mpep" and the subscriber node identity "1", and forwards the lookup request to its anchor directory router (i.e., directory router C (110C)). Directory router C (110C) inserts its anchor prefix "0" into the lookup message. Directory router C (110C) also calculates the bidirectional code for "game.mpeg", and then through interval routing, the lookup message is routed to the authoritative directory router for the bidirectional code of identifier "game.mpeg" (i.e., directory router G (110G)). The route taken by the lookup message (as part of the interval routing) is routers C-B-D-G.

Upon receiving the lookup message and based on the content identifier "game.mpeg" in the lookup message, the authoritative directory router (directory router G (110G)) retrieves the corresponding content item profile from its local code repository. As discussed above, the content item profile includes the publisher identity "1" and the publisher anchor prefix "011". Further, the authoritative directory router (i.e., directory router G (110G)) generates a lookup reply message that includes the publisher anchor prefix "011", the publisher identity "1", the subscriber anchor prefix "0" from the lookup message and the subscriber identity "1" also from the lookup message. The lookup reply message is routed using prefix routing and subscriber prefix "0" back to the directory router C (110C), which forwards it to subscriber node 1 (185A). The route taken by the lookup reply message (as part of the interval routing) is routers G-D-B-C.

Upon receiving the lookup request message, subscriber node 1 (185A) generates a data request message. The data request message includes subscriber anchor prefix "0", subscriber identity "1", publisher anchor prefix "011" (from the lookup reply message), and publisher identity "1" (from the lookup reply message). The data request message is routed using prefix routing and the publisher anchor prefix "011." Upon reaching intermediate router K (120K) in transit to the publisher anchor directory (i.e., directory router N (110N)), the data request message may be forwarded directly from intermediate router K (120K) to publisher node 1 (105A) (bypassing the publisher anchor directory). The route taken by the data request message (as part of the interval routing) is routers C-L-J-K then publisher node 1.

Upon receiving the data request message, publisher node 1 (105A) generates a data reply message. The data reply message is similar to the data request message except the data reply message also includes the video clip. The data request message is routed using prefix routing and the subscriber anchor prefix "0." Upon receipt, directory router C (110C) forwards the data reply message, or at least the video clip, to subscriber node 1 (185A) for consumption (e.g., display).

When the publish message was in transit to directory router G (110G), it passed through directory router L (110L). Directory router L (110L) may have generated a content item profile based on publish message and stored the content item profile and the identifier "game.mpeg" in its local code repository. However, the publish message still continued to directory router G (110G).

At a future time, subscriber node 2 (185B) wishes to consume the video clip with identifier "game.mpeg". Accordingly, subscriber node 2 (185B) generates a lookup request including the identifier "game.mpep" and the subscriber node identity "2", and forwards the lookup request to its anchor directory router (i.e., directory router Q (110Q)). Directory router Q (110Q) inserts its anchor prefix "010" into the lookup message. Directory router C (110C) also calculates the bidirectional code for "game.mpeg", and then through interval routing, the lookup message is routed towards the authoritative directory router for the bidirectional code of identifier "game.mpeg" (i.e., directory router G (110G)).

As part of the interval routing, the lookup message passes through directory router L (110L). Although directory router L (110L) is not the authoritative directory router for the bidirectional code corresponding to "game.mpeg", directory router L (110L) does have a content item profile for the "game.mpeg" from when the publish message was issued. Accordingly, directory router L (110L) is able to respond to the lookup message from subscriber node 2 (185B) with a lookup reply message. The lookup reply message includes the publisher anchor prefix "011", the publisher identity "1", the subscriber anchor prefix "010" from the lookup message and the subscriber identity "2" also from the lookup message. The lookup reply message is routed using prefix routing and subscriber prefix "010" back to the directory router Q (110Q), which forwards it to subscriber node 2 (185A).

Upon receiving the lookup request message, subscriber node 2 (185B) generates a data request message. The data request message includes subscriber anchor prefix "010", subscriber identity "2", publisher anchor prefix "011" (from the lookup reply message), and publisher identity "1" (from the lookup reply message). Assume subscriber node 2 (185B) is aware of directory route L (110L) and thus considers directory router L (110L) as a landmark directory. Accordingly, the data request message will also include the landmark prefix "01" (i.e., the prefix of landmark directory router (110L)).

The data request message is routed using prefix routing and the publisher anchor prefix "011." Upon reaching intermediate router K (120K) in transit to the publisher anchor directory (i.e., directory router N (110N)), the data request message may be forwarded directly from intermediate router K (120K) to publisher node 1 (105A) (bypassing the publisher anchor directory).

Upon receiving the data request message, publisher node 1 (105A) generates a data reply message. The data reply message is similar to the data request message (and includes the publisher landmark prefix "01") except the data reply message also includes the video clip. The data request message is routed using prefix routing and the publisher landmark prefix "01". Upon receipt, directory router L (110L) forwards the data reply message, or at least the video clip, to subscriber node 2 (185B) for consumption (e.g., display), bypassing the subscriber anchor directory (i.e., directory router Q (110Q)).

Figure 9:
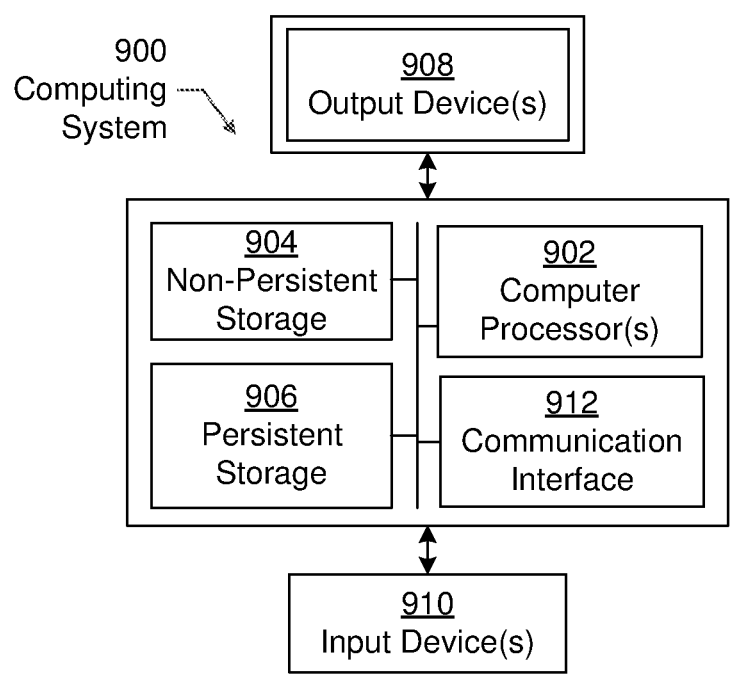
FIG. 9 shows a computer system in accordance with one or more embodiments of the invention.

Embodiments of the present disclosure may be implemented on a computing system. Any combination of mobile, desktop, server, router, switch, embedded device, or other types of hardware may be used. For example, as shown in FIG. 9, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the present disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the present disclosure.

Thus, the embodiments and examples set forth herein were presented in order to best explain various embodiments and their particular application(s) and to thereby enable those skilled in the art to make and use the embodiments. However, those skilled in the art will recognize that the foregoing description and examples have been presented for the purposes of illustration and example only. The description as set forth is not intended to be exhaustive or to be limiting to the precise form disclosed.

While many embodiments have been described, those skilled in the art, having benefit of this disclosure, will appreciate that other embodiments can be devised which do not depart from the scope. Accordingly, the scope of the present disclosure should be limited only by the attached claims.

What is claimed is:

1. An information centric network (ICN), comprising:
   a first anchor directory router comprising a first anchor prefix and configured to:
   obtain a publish message comprising an identifier associated with a content item;
   determine a bidirectional code for the content item is outside an authoritative code range assigned to the first anchor directory router;
   insert the first anchor prefix into the publish message; and
   forward the publish message based on interval routing and the bidirectional code;
   a second anchor directory router comprising a second anchor prefix and configured to:
   obtain a lookup message comprising the identifier;
   determine the bidirectional code for content item is outside an authoritative code range assigned to the second anchor directory router;
   insert the second anchor prefix into the lookup message; and
   forward the lookup message based on interval routing and the bidirectional code; and
   an authoritative directory router configured to:
   obtain the publish message and the lookup message;
   determine the bidirectional code for the identifier falls within an authoritative code range assigned to the authoritative directory router;
   generate, in response to the lookup message, a lookup reply message comprising the identifier, the first anchor prefix in the publish message, and the second anchor prefix in the lookup message; and
   forward the lookup reply message based on the second anchor prefix in the lookup reply message and prefix routing.

2. The ICN of claim 1, wherein the bidirectional code is a space filling curve code.

3. The ICN of claim 1, wherein the authoritative directory is further configured to:
   generate, in response to the bidirectional code falling within the authoritative code range, a publish acknowledgement message comprising the identifier and the first anchor prefix; and
   forward the publish acknowledgement message based on the first anchor prefix in the publish message and prefix routing towards the first anchor directory router.

4. The ICN of claim 1, wherein the first anchor directory router is further configured to:
   generate a publish acknowledgement message in response to obtaining the publish message;
   send the publish acknowledgement message to the publisher node; and
   update a local code repository of the first anchor directory router based on publish message.

5. The ICN of claim 1, wherein:
   the publish message is generated by a publisher node associated with the content item;
   the lookup message is generated by a subscriber node;
   the publish message comprises a first landmark prefix of a first landmark directory router known to the publisher node, wherein the landmark directory router is separate from the first anchor directory router;
   the lookup reply message comprises the first landmark prefix;
   the subscriber node issues, in response to the lookup reply message, a data request message comprising the first landmark prefix and a second landmark prefix of a second landmark directory known to the subscriber node, and
   the publisher node generates, in response to the data request message, a data reply message comprising the content item, the first landmark prefix, and the second landmark prefix.

6. The ICN of claim 5, further comprising an intermediate directory router configured to:
   obtain the data reply message;
   store a copy of the content item from the data reply message in a cache of the intermediate directory router;
   forward the data reply message using prefix routing; and
   generate, by the intermediate directory router, an additional publish message for the content item and comprising a prefix of the intermediate directory router.

7. The ICN of claim 1, wherein the lookup message is associated with a subscriber node and comprises:
   the second anchor prefix of the second anchor directory router for the subscriber node; and
   the identifier associated with the content item,
   wherein the subscriber node issues a data request message for the content item based on the lookup reply message.

8. The ICN of claim 1, wherein:
   the publish message comprises a first landmark prefix of a first landmark directory router known to the publisher node, wherein the landmark directory router is separate from the first anchor directory router;
   updating the local code repository associated with the authoritative directory router comprises storing the first landmark prefix;
   the lookup reply message comprises the first landmark prefix retrieved from the local code repository associated with the authoritative directory router,
   the data request message comprises the first landmark prefix and a second landmark prefix of a second landmark directory known to the subscriber node; and
   the publisher node generates, in response to the data request message, a data reply message comprising the content item, the first landmark prefix, and the second landmark prefix.

9. The ICN of claim 8, further comprising:
   obtaining, by an intermediate directory router in the ICN, the lookup reply message;
   updating a local code repository of the intermediate directory router with the identifier, the first anchor prefix, and the first landmark prefix from the lookup reply message;
   forwarding, by the intermediate directory router, the lookup reply message using prefix routing and at least one selected from a group consisting of the first anchor prefix and the first landmark prefix;
   obtaining, by the intermediate directory router, an additional lookup message comprising the identifier; and
   generating, by the intermediate directory router and in response to the additional lookup reply message, an additional reply message comprising the first anchor prefix and the first landmark prefix from the local code repository of the intermediate directory router.

10. The ICN of claim 1, wherein the first anchor directory router, the second anchor directory router, and the authoritative directory router form a trie.

11. The ICN of claim 10, wherein the trie comprises a lineage created of interval routing and prefix routing.

12. The ICN of claim 11, wherein the interval routing is a predetermined range of consecutive code distributed among a parent-child relationship.

13. The ICN of claim 11, wherein the prefix routing, a parent-child relationship, assigns a pre-fixed naming such that the parent's prefix is a prefix of its child.

* * * * *